United States Patent
Hwang

(10) Patent No.: US 8,823,855 B2
(45) Date of Patent: Sep. 2, 2014

(54) USER EQUIPMENT AND METHOD FOR PROVIDING AUGMENTED REALITY (AR) SERVICE

(75) Inventor: Ju Hee Hwang, Ansan-si (KR)

(73) Assignee: Pantech Co., Ltd., Seoul (KR)

( * ) Notice: Subject to any disclaimer, the term of this patent is extended or adjusted under 35 U.S.C. 154(b) by 470 days.

(21) Appl. No.: 13/212,969

(22) Filed: Aug. 18, 2011

(65) Prior Publication Data

US 2012/0092528 A1    Apr. 19, 2012

(30) Foreign Application Priority Data

Oct. 13, 2010 (KR) ........................ 10-2010-0100008

(51) Int. Cl.
*H04N 5/222* (2006.01)
(52) U.S. Cl.
USPC .................................. 348/333.02; 348/211.9
(58) Field of Classification Search
USPC ................................ 348/211.9, 231.6, 333.02
See application file for complete search history.

(56) References Cited

U.S. PATENT DOCUMENTS

| 2006/0001757 | A1* | 1/2006 | Sawachi | 348/333.12 |
| 2010/0268451 | A1* | 10/2010 | Choi | 701/201 |
| 2012/0099000 | A1* | 4/2012 | Kim | 348/231.99 |
| 2012/0105475 | A1* | 5/2012 | Tseng | 345/633 |

FOREIGN PATENT DOCUMENTS

| EP | 1 924 083 | 5/2008 |
| JP | 10-332396 | 12/1998 |
| JP | 2002-169640 | 6/2002 |
| JP | 2003-216982 | 7/2003 |
| JP | 2010-231741 | 10/2010 |
| KR | 10-0651508 | 11/2006 |
| KR | 10-2009-0106069 | 10/2009 |
| KR | 10-2010-0013348 | 2/2010 |
| KR | 101002030 | 12/2010 |
| KR | 10-2011-0097305 | 8/2011 |
| WO | 00/73888 | 12/2000 |

OTHER PUBLICATIONS

Extended European Search Report issued on Jul. 10, 2013 in European Patent Application No. 11 18 3744.
Non-Final Office Action issued on Jan. 16, 2014 in U.S. Appl. No. 13/212,981.

* cited by examiner

*Primary Examiner* — Gevell Selby
(74) *Attorney, Agent, or Firm* — H.C. Park & Associates, PLC

(57) ABSTRACT

An augmented reality (AR) service including a photographing unit to capture an image of a target object, an information collecting unit to collect contextual information of the captured image of the target object, a tag generating unit to generate an AR tag of a first direction, the AR tag corresponding to the contextual information, and a display unit to display the image of the target object and the AR tag. A method for providing an AR service including capturing an image of a target object with a camera, collecting contextual information including location information of the captured image of the target object and a first azimuth information between the target object and the camera, generating an AR tag corresponding to the contextual information, and displaying the captured image of the target object and the generated AR tag.

25 Claims, 13 Drawing Sheets

USER EQUIPMENT AND METHOD FOR PROVIDING AUGMENTED REALITY (AR) SERVICE

CROSS-REFERENCE TO RELATED APPLICATION

This application claims priority from and the benefit under 35 U.S.C. §119(a) of Korean Patent Application No. 10-2010-0100008, filed on Oct. 13, 2010, which is incorporated by reference for all purposes as if fully set forth herein.

BACKGROUND

1. Field

The following description relates to a user equipment and a method for providing an augmented reality (AR) service, and more particularly, to a user equipment and a method for providing a service in which a user may generate AR tag information based on an azimuth.

2. Discussion of the Background

Augmented reality (AR) is one field of a virtual reality technology and refers to a computer graphic technology for combining an image of a real world environment with a virtual object or virtual information. Unlike a general virtual reality technology which provides virtual objects in a virtual space, the AR technology combines the real world environment with the virtual object or information, thereby adding supplementary information that may be difficult to obtain in the real world environment. The AR technology may apply a filter to the identified objects in an image of the real world environment to filter a target virtual object or virtual information sought by the user from the real environment.

However, there may be a limitation on how much information may be provided through a conventional AR service. Generally, the conventional AR service may provide basic information through AR technology using global positioning system (GPS) information of an object. That is, the conventional AR service may provide the same information even if there is a change in a location of a user looking at the object.

SUMMARY

Exemplary embodiments of the present invention provide a user equipment and a method for providing an augmented reality (AR) service in which an AR tag may be generated based on an azimuth toward an object viewed by a user.

Additional features of the invention will be set forth in the description which follows, and in part will be apparent from the description, or may be learned by practice of the invention.

Exemplary embodiments of the present invention provide a user equipment to provide an AR service including a photographing unit to capture an image of a target object, an information collecting unit to collect contextual information of the captured image of the target object, the contextual information including location information of the photographing unit and a first azimuth information between the target object and the photographing unit, a tag generating unit to generate an AR tag of a first direction, the AR tag corresponding to the contextual information, and a display unit to display the image of the target object and the AR tag.

Exemplary embodiments of the present invention provide a user equipment to provide an AR service including a photographing unit to capture an image of a target object, an information collecting unit to collect contextual information of the captured image of the target object, the contextual information including location information of the photographing unit and image data of the target object, a communication unit to transmit the collected contextual information to an AR management server and to receive AR information of the target object from the AR management server, in which the AR management server stores the AR information of the target object based on azimuth information of the captured image, a tag generating unit to generate an AR tag using AR information corresponding to a first azimuth between the target object and the photographing unit, and a display unit to display the captured image of the target object and the generated AR tag.

Exemplary embodiments of the present invention provide a method for providing an AR service including capturing an image of a target object using a camera, collecting contextual information including location information of the captured image of the target object and a first azimuth information between the target object and the camera, generating an AR tag corresponding to the contextual information, and displaying the captured image of the target object and the generated AR tag.

Exemplary embodiments of the present invention provide a method for providing an AR service including capturing an image of a target object, collecting contextual information including location information of a camera capturing the target object from the terminal and image data of the target object from the image, transmitting the collected contextual information to an AR management server to store AR information of the target object for a first azimuth, receiving the AR information of the target object from the AR management server, generating an AR tag using the AR information corresponding to the first azimuth between the target object and the camera, and displaying the captured image of the target object and the AR tag.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
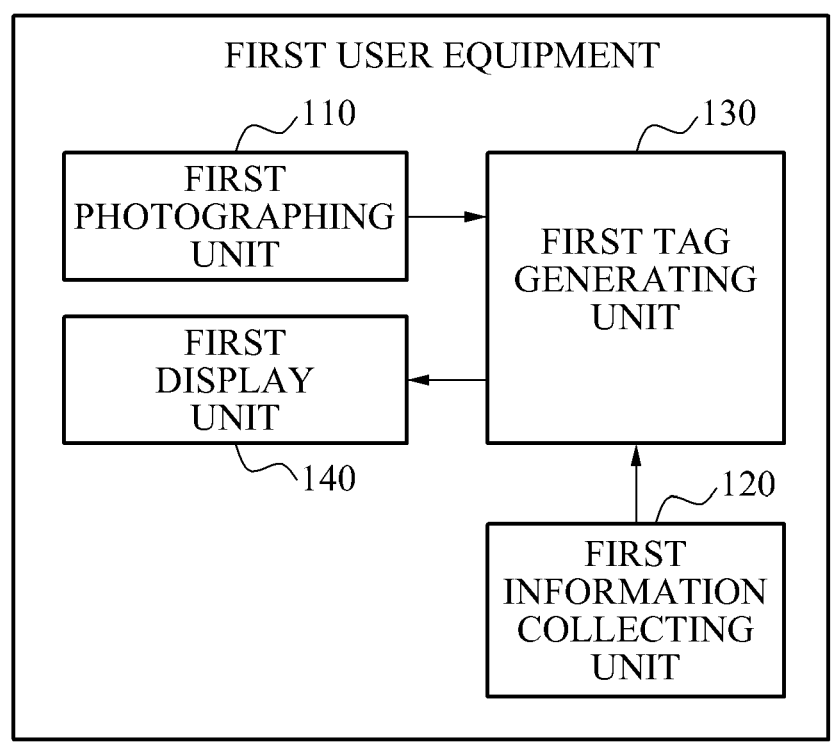
FIG. 1 is a block diagram illustrating a first user equipment to provide an augmented reality (AR) service according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of" will be interpreted to mean any combination of the enumerated elements following the respective language, including combinations of multiples of the enumerated elements. For example, "at least one of X, Y, and Z" will be construed to mean X only, Y only, Z only, or any combination of two or more items X, Y, and Z (e.g., XYZ, XZ, YZ). Throughout the drawings and the detailed description, unless otherwise described, the same drawing reference numerals are understood to refer to the same elements, features, and structures. The relative size and depiction of these elements may be exaggerated for clarity, illustration, and convenience.

Further, it will be understood that if an element is referred to as being "connected to" another element, it can be directly connected to the other element, or intervening elements may be present. In contrast, if an element is referred to as being "directly connected to" another element, no intervening elements are present.

FIG. 1 is a block diagram illustrating a first user equipment 100 to provide an augmented reality (AR) service according to an exemplary embodiment of the invention.

Referring to FIG. 1, the first user equipment 100 may be a portable device, such as a smartphone, a cellular phone, a laptop computer, tablet computer, and the like. As shown in FIG. 1, the first equipment 100 includes a first photographing unit 110, a first information collecting unit 120, a first tag generating unit 130, and a first display unit 140.

The first photographing unit 110 may photograph or capture an image of a target object, and may be, for example, an embedded camera or an external camera. The obtained image may be processed into a displayable signal by the first photographing unit 110 or by a separate image processor.

The first information collecting unit 120 may collect contextual information including information about a current location of the first user equipment 100, location information of the target object photographed or captured by the first photographing unit 110, direction information currently viewed by the first photographing unit 110, and azimuth information between the first user equipment 100 and the target object. Further, the location information, direction information, azimuth information, and the like, may be collected from data associated with the captured image, the user equipment, or other source. The azimuth information may include a numeric value of an azimuth between the first user equipment 100 and the target object. In an example, azimuth may reference an angle measured up from the horizon. That is, the azimuth information may include an angle from a reference point on the user equipment 100 to the target object, measured relative to the horizon. The reference point on the user equipment 100 may be defined as an upper point, edge, or surface, or lower point, edge, or surface, or may be defined from a focal lens of the photographing unit 110.

The first tag generating unit 130 may generate an AR tag corresponding to contextual information collected by the first information collecting unit 120. As described above, the contextual information may include location information, direction information, and azimuth information. The AR tag may be generated in the form or shape of a window to display AR information of the target object. Accordingly, the AR tag may be generated based on an azimuth used to photograph or capture the target object. The AR information of the target object may be stored for one or more contextual information in the first user equipment 100 or in an AR management server (not shown).

The first display unit 140 may display a generated AR tag such that the AR tag may be overlaid on the target object.

Figure 2:
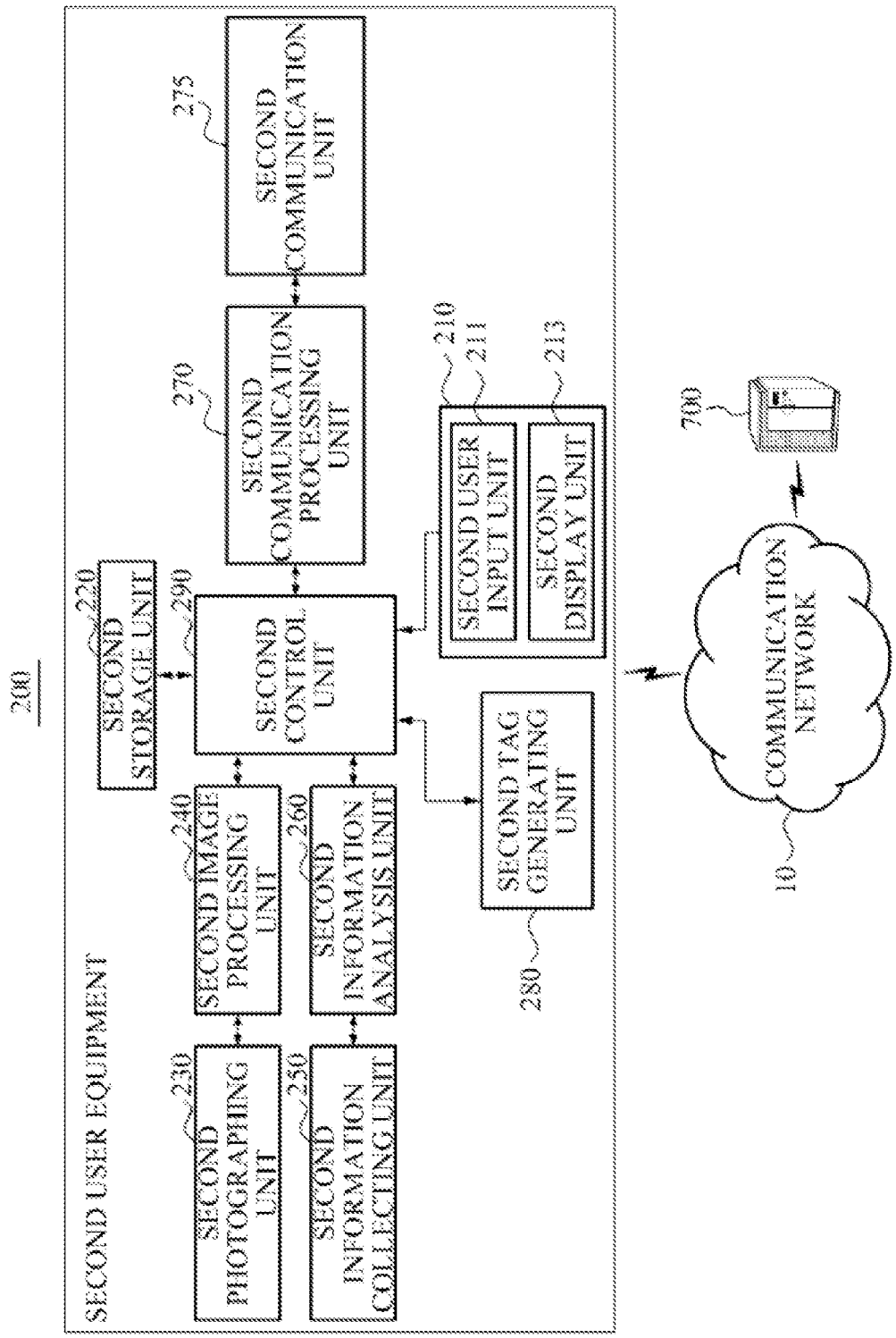
FIG. 2 is a block diagram illustrating a second user equipment to provide an AR service according to an exemplary embodiment of the invention.
Figure 3:
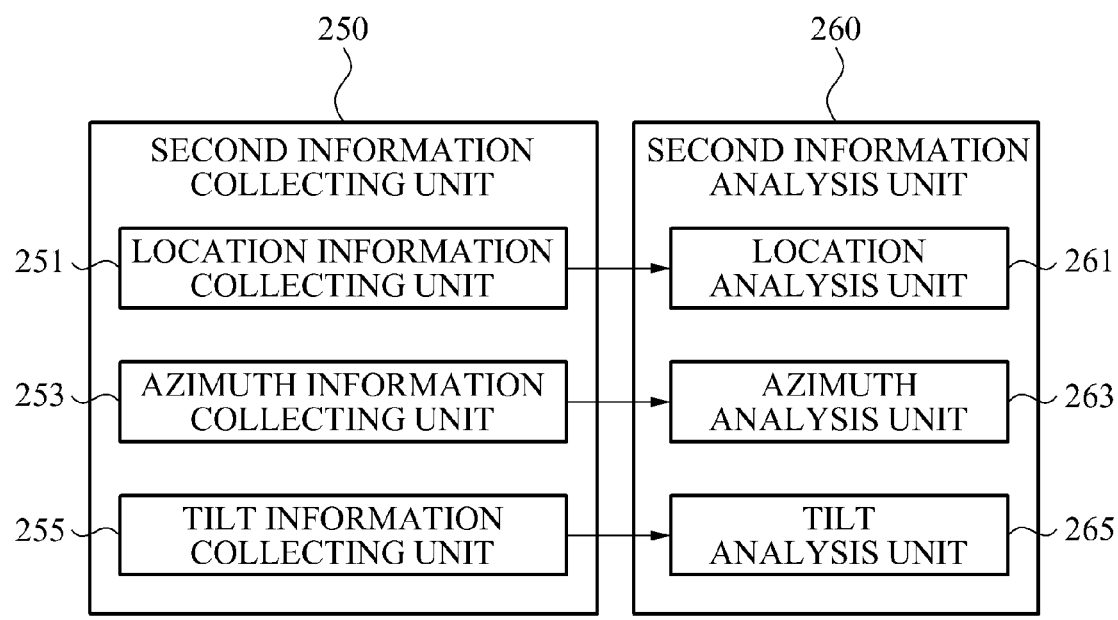
FIG. 3 is a block diagram illustrating a second information collecting unit and a second information analysis unit according to an exemplary embodiment of the invention.

FIG. 2 is a block diagram illustrating a second user equipment 200 to provide an AR service according to an exemplary embodiment of the invention. FIG. 3 is a detailed block diagram illustrating a second information collecting unit and a second information analysis unit according to an exemplary embodiment of the invention.

As shown in FIG. 2, the second user equipment 200 includes a second user interface (UI) unit 210, a second storage unit 220, a second photographing unit 230, a second image processing unit 240, a second information collecting unit 250, a second information analysis unit 260, a second communication processing unit 270, a second communication unit 275, a second tag generating unit 280, and a second control unit 290.

The second UI unit 210 may provide a user with the ability to interface with the user equipment 200, and may include a second user input unit 211 and a second display unit 213.

The second user input unit 211 may be a manipulation panel to receive an input of a user command, and may include various interfaces. For example, interfaces may include a button to photograph or capture a target object, a direction key, a touch panel, and the like. In particular, a user may make a request to display an AR tag based on an azimuth by manipulating the second user input unit 211. Also, if a user touches an AR tag displayed on the second display unit 213, the second user input unit 211 may sense a touch direction of the user. More specifically, if the user touches the AR tag with multiple faces displayed on the second display unit 213 and drags the AR tag to rotate to view a different face of the AR tag, the second user input unit 211 may sense the touch and the drag motion.

If an image inputted from the second photographing unit 230 is processed into a signal, the second display unit 213 may display the processed image. If the user equipment 200 provides a touch-based input method, the second display unit 213 may display a UI of a touch panel.

The second storage unit 220 may store a program used to enable an operation of the user equipment 200, various data and information, and the like. Also, the second storage unit 220 may store AR information of a target object mapped to contextual information of the target object.

The second photographing unit 230 may photograph or capture an image of the target object to obtain image data. In an example, second photographing unit 230 includes an embedded camera or an external camera.

The second image processing unit 240 may analyze the image obtained by the second photographing unit 230, and may process the image into a displayable signal using the analysis result. In an example, the second image processing unit 240 may be an image processor.

The second information collecting unit 250 may collect contextual information including information related to a location, a tilt position, and an azimuth of the user equipment 200, which may be collected from data associated with the captured image, the user equipment, or other source. Referring to FIG. 3, the second information collecting unit 250 may include a location information collecting unit 251, an azimuth information collecting unit 253, and a tilt information collecting unit 255.

The location information collecting unit 251 may collect location information about a current location of the user equipment 200 and direction information about a direction toward a target object currently viewed by the second photographing unit 230. Also, the location information collecting unit 251 may further collect location information of the target object. In an example, the location information collecting unit 251 may sense and collect a current location using a global positioning system (GPS), a location-based service (LBS), and the like. Further, the location information collecting unit 251 may also sense and collect a direction using a digital compass. The location information and the direction information collected by the location information collecting unit 251 may be provided to a location analysis unit 261.

The azimuth information collecting unit 253 may collect azimuth information about an azimuth between the user equipment 200 and the target object. The azimuth information collected by the azimuth information collecting unit 253 may be provided to an azimuth analysis unit 263.

The tilt information collecting unit 255 may collect tilt information about a tilt of the user equipment 200. The tilt information may be information about the tilt position of the user equipment 200. The user equipment 200 may be frequently tilted in various directions by manipulation of a user before the user equipment 200 photographs or captures the target object. In an example, the tilt information collecting unit 255 may sense and collect tilt information, for example, using a six-axis motion sensor including a three-axis Gyroscope sensor and a three-axis (x, y, z) acceleration sensor. The tilt information collected by the tilt information collecting unit 255 may be provided to a tilt analysis unit 265. The tilt information may be optionally collected.

The second information analysis unit 260 may analyze information collected by the second information collection unit 250 using a processible signal. Referring to FIG. 3, the second information analysis 260 may include a location analysis unit 261, an azimuth analysis unit 263, and a tilt analysis unit 265.

The location analysis unit 261 may analyze the location information and the direction information collected by the location information collection unit 251 using a processible signal.

The azimuth analysis unit 263 may analyze the azimuth information collected by the azimuth information collection unit 253 using a processible signal.

The tilt analysis unit 265 may analyze the tilt information collected by the tilt information collection unit 255 using a processible signal.

Referring back to FIG. 2, the second communication processing unit 270 may convert the analyzed contextual information and image data of the target object into data based on a transmission protocol by the second control unit 290.

The second communication unit 275 may transmit data inputted from the second communication processing unit 270 to an AR management server 700 via a communication network 10. Also, the second communication unit 275 may receive AR information corresponding to contextual information from the AR management server 700. The AR management server 700 may store AR information corresponding to different contextual information. The AR management server 700 is described below with reference to FIG. 7.

The second communication processing unit 270 may convert the received AR information into data available in the second user equipment 200.

The second tag generating unit 280 may generate an AR tag corresponding to contextual information collected by the second information collecting unit 250. More specifically, the AR tag is generated using AR information converted by the second communication processing unit 270. The AR tag may be generated in a form of a window to display AR information of the target object. The second tag generating unit 280 may generate an AR tag to display both AR information and contextual information of the target object.

Also, the second tag generating unit 280 may generate an AR tag having one or more faces along a contour of the target object. AR information based on an azimuth between the target object and the second photographing unit 230 may be displayed on one or more faces of the AR tag. For example, if the target object is a building, the second tag generating unit 280 may generate an AR tag of a three-dimensional stereoscopic cube, and if the target object is a sphere, the second tag generating unit 280 may generate a spherical AR tag.

The second display unit 213 may display an AR tag generated by the second tag generating unit 280.

The second control unit 290 may control an operation of the second user equipment 200. In particular, the second control unit 290 may request the AR management server 700 to provide AR information of the target object corresponding to contextual information by transmitting the analyzed contextual information and image data of the object to the AR management server 700.

Before the second control unit 290 makes a request to the AR management server 700 to provide AR information, the second control unit 290 may check whether AR information corresponding to contextual information is stored in the second storage unit 220. If AR information corresponding to contextual information is stored in the second storage unit 220, the second control unit 290 may control the second tag generating unit 280 to generate an AR tag using the AR information stored in the second storage unit 220. If AR information corresponding to contextual information is not stored in the second storage unit 220, the second control unit 290 may request the AR management server 700 to transmit the AR information.

Figure 4A:
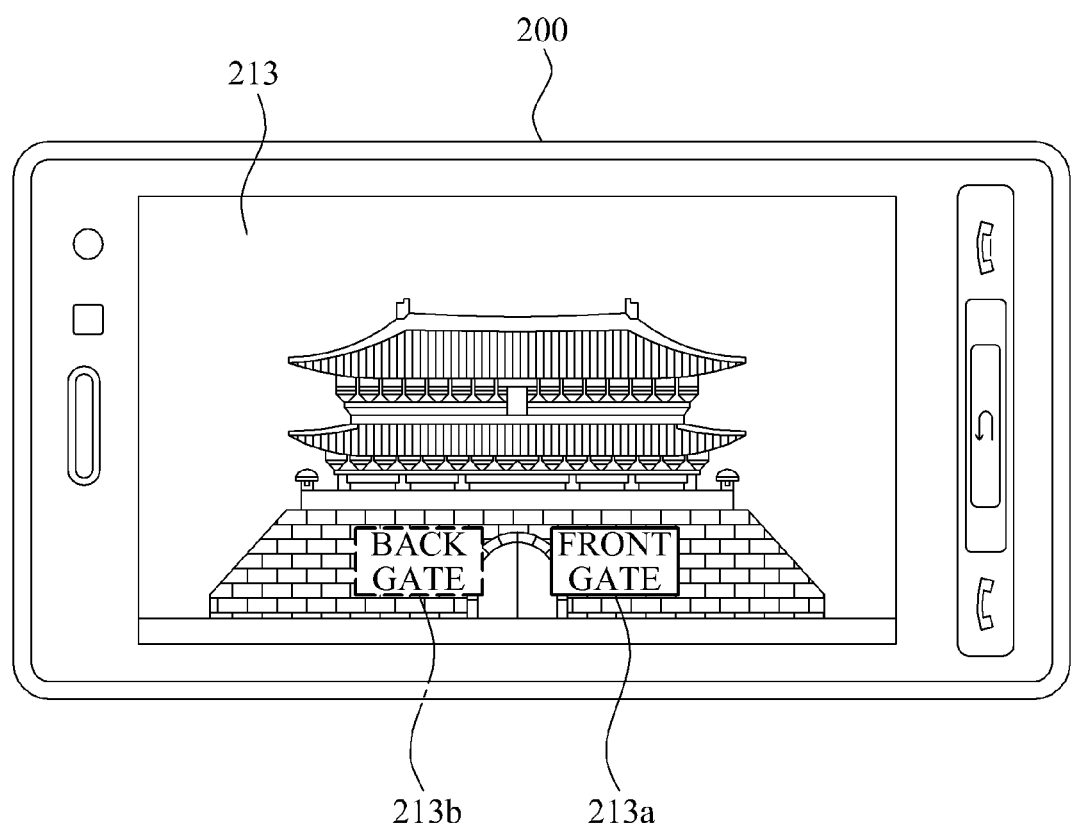
FIG. 4A, FIG. 4B, and FIG. 4C are views illustrating an AR tag displayed on a second display unit according to an exemplary embodiment of the invention.
Figure 4B:
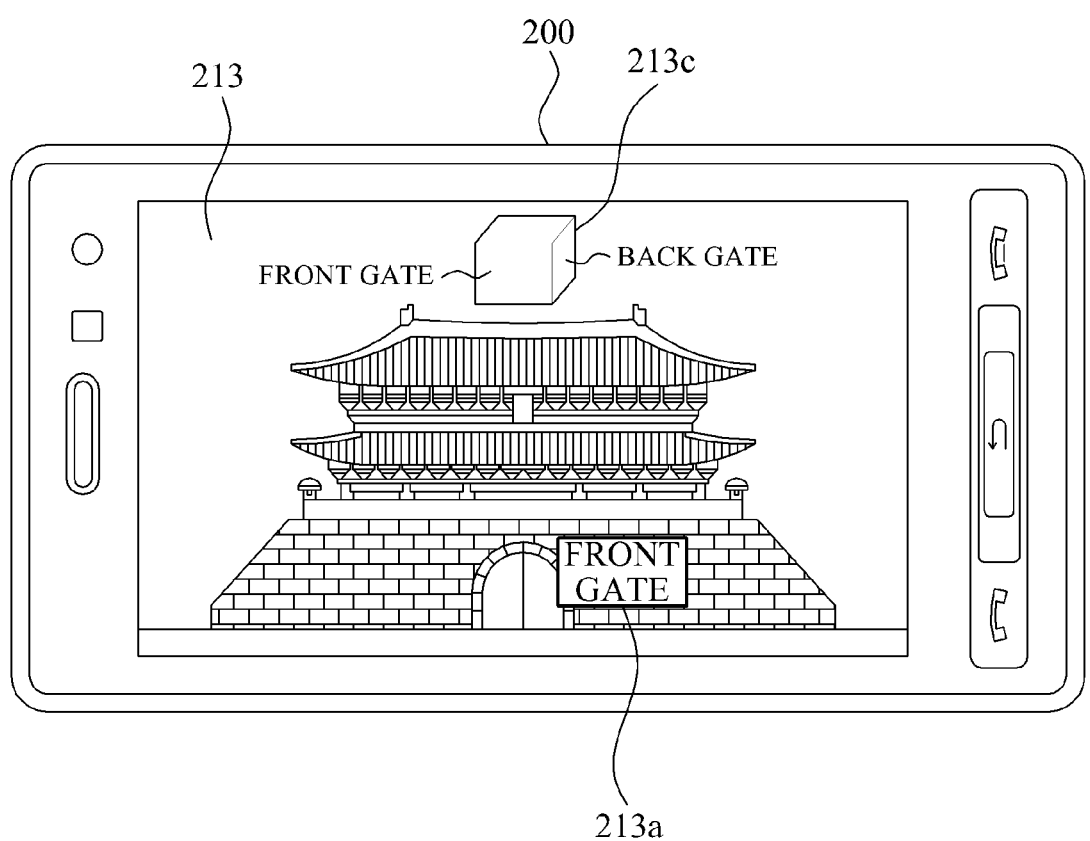
Figure 4C:
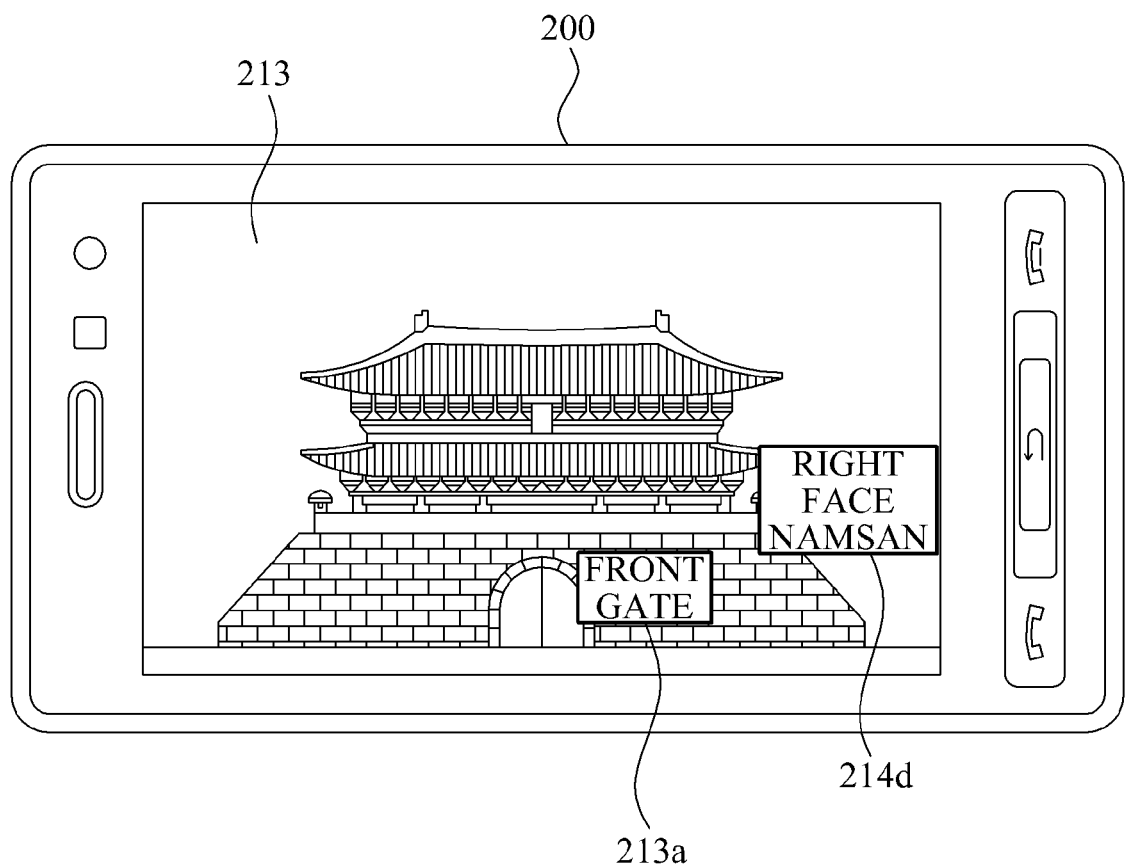

FIG. 4A, FIG. 4B, and FIG. 4C are views illustrating an AR tag displayed on the second display unit according to an exemplary embodiment of the invention.

Referring to FIG. 4A, if a user photographs or captures a target object 'Namdaemun' using the second photographing unit 230 of the user equipment 200, the second display unit 213 may display the target object 'Namdaemun'. If the user equipment 200 receives a user request to display an AR tag of 'Namdaemun' at a current location, the second information collecting unit 250 may collect contextual information including location information about the current location, direction information, azimuth information, and tilt information. The second information analysis unit 260 may analyze the collected contextual information, and the second tag generating unit 280 may generate AR tag 213*a* using AR information corresponding to the contextual information. The AR information corresponding to the contextual information may be stored in the second storage unit 220 or may be provided from the AR management server 700.

If the user requests to display the AR tag after the user moves to a location where the user views a back gate of 'Namdaemun', the second tag generating unit 280 may generate AR tag 213*b* using AR information corresponding to contextual information of the moved location. That is, different AR tags of the same target object based on different azimuths may be generated and displayed.

Referring to FIG. 4B, because the target object 'Namdaemun' is a building, the second tag generating unit 280 may further generate a cubic AR tag 213*c* having six faces. The same or different AR information may be displayed on each face of the AR tag 213*c*. If different AR information is displayed, the second user equipment 200 may receive AR information corresponding to one or more azimuths from the AR management server 700. Accordingly, the user may check AR information of the target object generated at a different azimuth using the AR tag 213*c*.

Referring to FIG. 4C, the second tag generating unit 280 may generate AR tag 214*d* corresponding to a right face of the target object at a current location of the user. More specifically, because the right face of the target object is not shown or is partially shown at the current location of the user, the AR tag 214*d* may be displayed at an angle. In an example, the user may set or preset an azimuth range visible to the user, and the second tag generating unit 280 may generate AR tags corresponding to azimuths within the set range. In FIG. 4C, because the user may set an azimuth range as, for example 360°, the AR tag 214*d* corresponding to the right face of the target object may be displayed.

Figure 5:
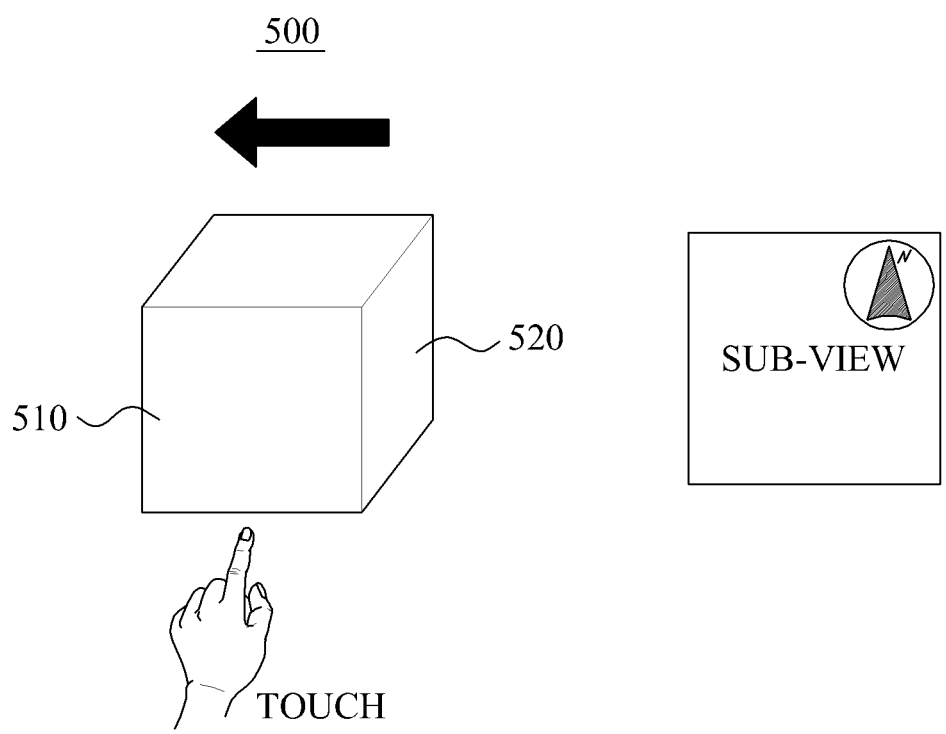
FIG. 5 is a view illustrating a method for displaying AR information by touching an AR tag according to an exemplary embodiment of the invention.

FIG. 5 is a view illustrating a method for displaying AR information by touching an AR tag according to an exemplary embodiment of the invention.

Referring to FIG. 5, the second tag generating unit 280 may generate a stereoscopic AR tag 500 of a cubic shape having multiple faces. The second tag generating unit 280 may display different AR information depending on an azimuth toward the target object on one or more faces of the AR tag 500. AR information corresponding to an azimuth between a current location of the second user equipment 200 and the target object may be displayed on a first face 510 of the AR tag 500. The displayed AR tag 500 may be displayed and may also be rotated in various directions, including upward, downward, left and right directions.

For example, if the user touches a second face 520 or touches the AR tag 500 that is displayed and rotates it in a left direction, the second user input unit 211 may sense the touched face 520 and/or the touch direction of the user, respectively. The second tag generating unit 280 may enable AR information corresponding to a second azimuth of the target object to be displayed in a frontal direction by rotating the AR tag 500 to either the face that has been selected by a touch and/or rotating the AR tag 500 according to the touch direction inputted by the user. In an example, the AR tag 500 may be rotated according to the sensed touched face 520 as illustrated in FIG. 5 and/or by touching and dragging the AR tag 500 to rotate in the touch direction so that the user may see the face 520 as the front view. Also, if the user requests a sub-view, the second tag generating unit 280 may generate a sub-view and may enable an azimuth and/or a direction of a currently displayed AR information of the AR tag 500 to be checked using a compass arrow of the sub-view to indicate such information. That is, the compass arrow of the sub-view may show an azimuth and/or direction.

Figure 6:
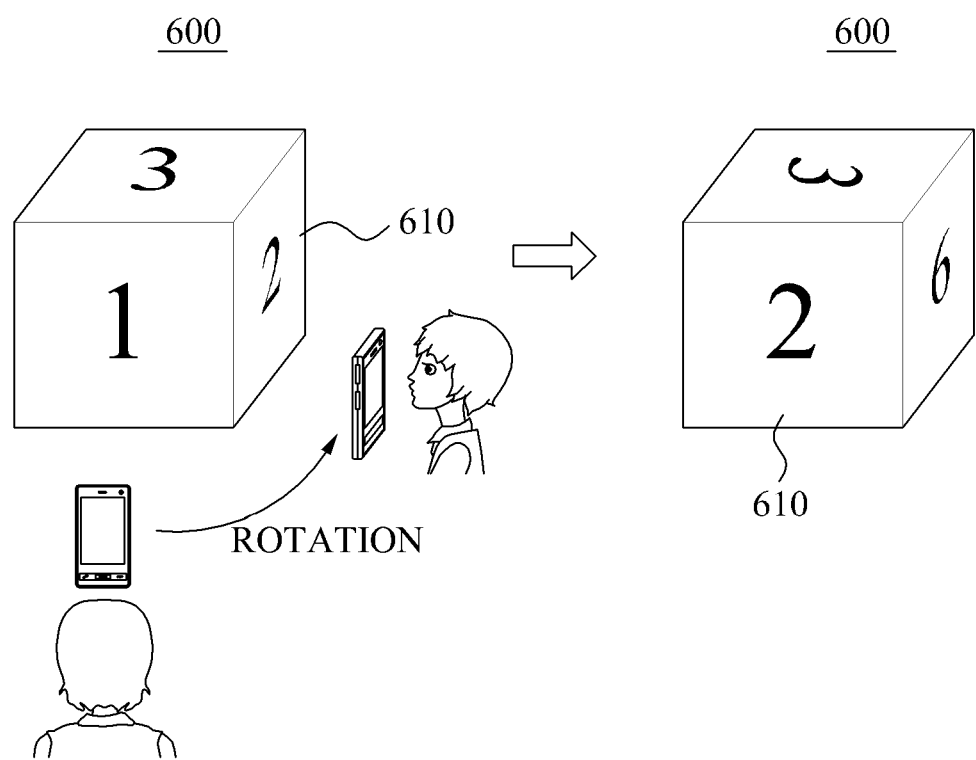
FIG. 6 is a view illustrating a method for displaying AR information of an AR tag by moving a second user equipment according to an exemplary embodiment of the invention.

FIG. 6 is a view illustrating a method for displaying AR information of an AR tag by moving the second user equipment 200 according to an exemplary embodiment of the invention.

Referring to FIG. 6, the second tag generating unit 280 may generate an AR tag of a target object as a cubic AR tag 600 having multiple faces. If movement of the AR tag 600 is difficult or undesirable and the second user equipment 200 photographing or capturing the target object is rotated in an arbitrary direction, the second tag generating unit 280 may generate an AR tag corresponding to an azimuth toward the target object viewed in the rotated direction relative to the target object. For example, if the second user equipment 200 is rotated in a right direction or the user rotates the body of the user in a right direction after a first face of the AR tag 600 is displayed in a frontal direction, the second tag generating unit 280 may enable AR information corresponding to a right face 610 of the AR tag 600, or the second face, to be displayed in a frontal direction. Accordingly, the second tag generating unit 280 may provide a target view sought by the user by directly rotating the AR tag 600 in upward, downward, left and right directions.

Figure 7:
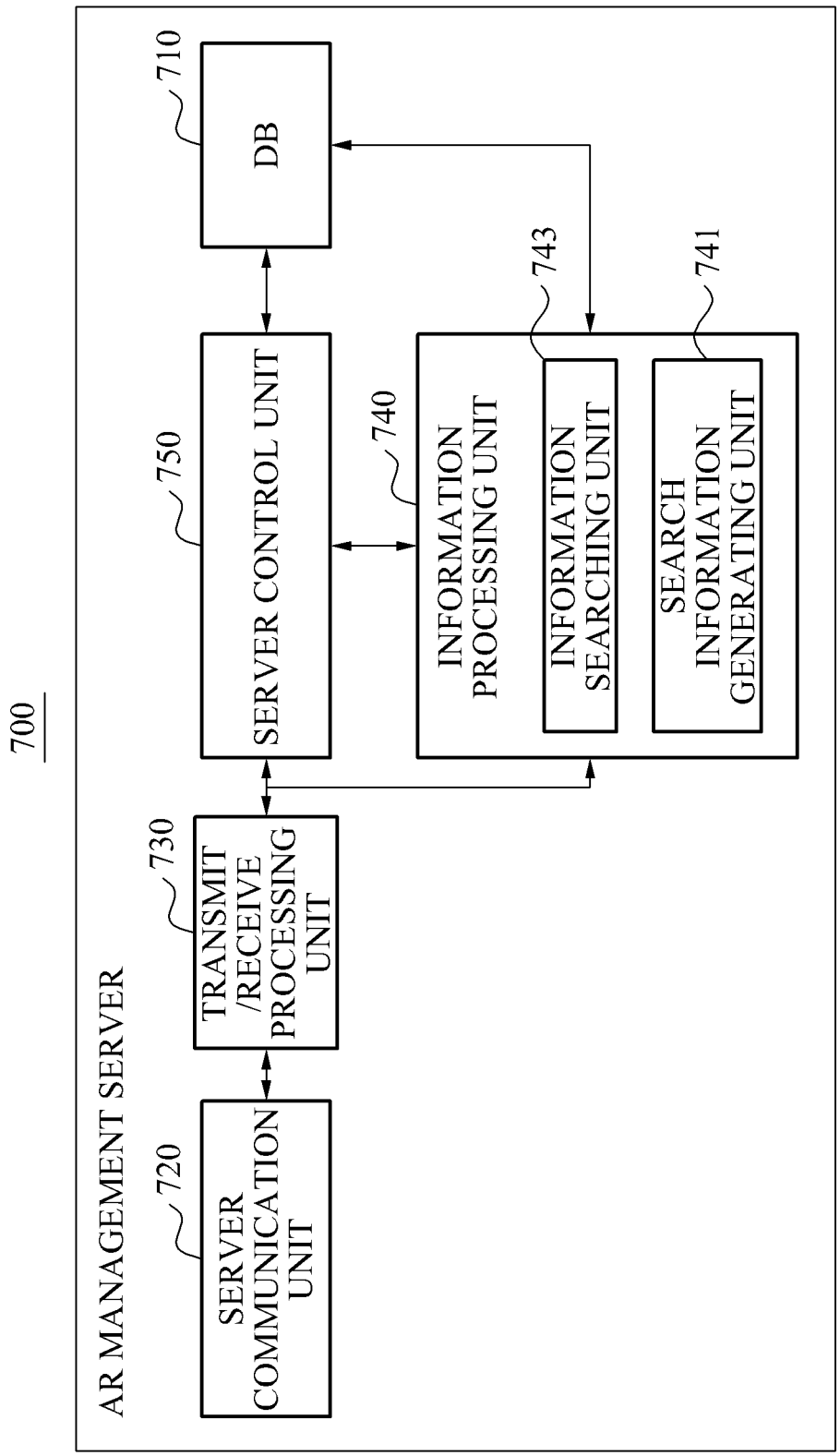
FIG. 7 is a block diagram of an AR management server according to an exemplary embodiment of the invention.

FIG. 7 is a block diagram of the AR management server 700 according to an exemplary embodiment of the invention.

Referring to FIG. 7, the AR management server 700 may store and manage AR tag information generated by one or more user equipments, together with contextual information. Referring to FIG. 7, the AR management server 700 may include a database (DB) 710, a server communication unit 720, a transmit/receive processing unit 730, an information processing unit 740, and a server control unit 750.

The DB 710 may store and manage AR information of a target object mapped to one or more contextual information. Accordingly, AR information of the same target object may be stored and managed for one or more contextual information collected through photographing or capturing a target object. As described above, the contextual information may include information about a location and a direction used to photograph or capture the target object, and location information, azimuth information and tilt information of the target object. In an example, among the contextual information stored in the DB 710, the azimuth information may be stored as a reference range. For example, if the stored AR information is information corresponding to an azimuth of 200°, 200°±α (α is an error) may be stored in the DB 710 as azimuth information corresponding to AR information. The azimuth range may be manually set by a user or an operator or may be automatically set by the server control unit 750. The AR information stored in the DB 710 may be shared by one or more user equipments.

The server communication unit 720 may communicate with one or more user equipments including the second user equipment 200 via a communication network. Hereinafter, description is made taking the second user equipment 200 as an example. The server communication unit 720 may receive a signal to request provisioning of AR information and may receive contextual information from the second user equipment 200. The server communication unit 720 may further receive image data of the target object.

The transmit/receive processing unit 730 may determine whether the received AR information and the received contextual information is available. More specifically, the transmit/receive processing unit 730 may determine whether an error has occurred in receiving the AR information and the contextual information or whether the received AR information and the contextual information contains improper information. If the AR information and the contextual information is available, the transmit/receive processing unit 730 may provide the signal and the contextual information to the information processing unit 740.

The information processing unit 740 may search the DB 710 for AR information corresponding to location information among contextual information. The information processing unit 740 may include a search information generating unit 741 and an information searching unit 743.

The search information generating unit 741 may set search information for a query to the DB 710. The search information may be used with respect to a search regarding whether AR information corresponding to location information among the received contextual information is stored in the DB 710. The search information generating unit 741 may set search information by processing the contextual information inputted from the transmit/receive processing unit 730, and may generate the search information in the type of a header. In an example, the search information may be location information of the second user equipment 200.

The information searching unit 743 may search the DB 710 using the search information and may extract AR information corresponding to location information.

The server control unit 750 may check AR information corresponding to azimuth information of contextual information. The server control unit 750 may control the transmit/receive processing unit 730 and the server communication unit 720 to provide AR information corresponding to azimuth information to the second user equipment 200. If azimuth information corresponding to the extracted AR information is stored as an azimuth range, the server control unit 750 may provide AR information corresponding to an azimuth range closest to the azimuth information of the contextual information.

Also, the server control unit 750 may configure an AR tag using AR information corresponding to azimuth information and may provide AR tag configuration data to the second user equipment 200. If contextual information except azimuth information is received from the second user equipment 200, the server control unit 750 may configure a basic AR tag and may provide AR tag configuration data to the second user equipment 200.

The transmit/receive processing unit 730 may convert AR information corresponding to azimuth information into data depending on a transmission protocol. The server communication unit 720 may transmit the converted AR information to the second user equipment 200.

After the second user equipment 200 receives AR information, the second user equipment 200 may process the AR information of the target object being photographed or captured to generate an AR tag and may display the AR tag on the second display unit 213.

Figure 8:
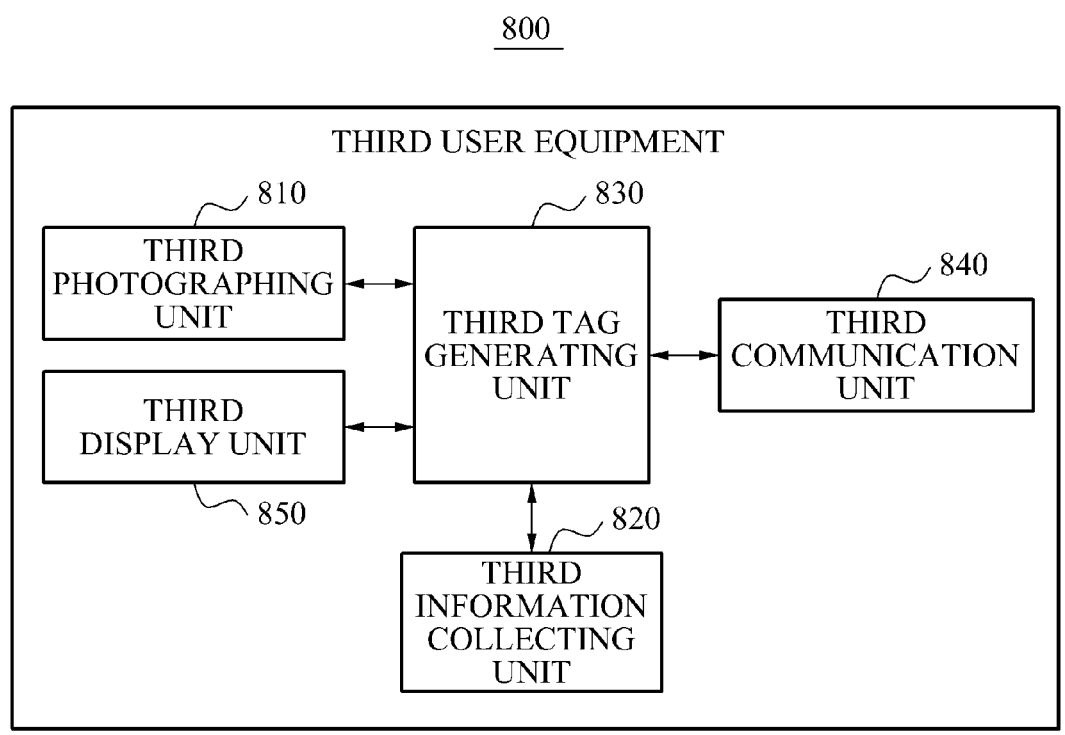
FIG. 8 is a block diagram of a third user equipment to provide an AR service according to an exemplary embodiment of the invention.

FIG. 8 is a block diagram of a third user equipment 800 to provide an AR service according to an exemplary embodiment of the invention.

Referring to FIG. 8, the third user equipment 800 may include a third photographing unit 810, a third information collecting unit 820, a third tag generating unit 830, a third communication unit 840, and a third display unit 850. The third photographing unit 810, the third information collecting unit 820, the third tag generating unit 830, and the third display unit 850 of FIG. 8 are similar, respectively, to the first photographing unit 110, the first information collecting unit 120, the first tag generating unit 130, and the first display unit 140 of FIG. 1, and thus, detailed description thereof is omitted herein.

The third communication unit 840 may request an AR management server 700 (not shown in FIG. 8) to provide AR information of a target object by transmitting, to the AR management server 700, contextual information including location information, direction information and azimuth information. More specifically, the contextual information may include current location of the third user equipment 800 collected by the third information collecting unit 820, location information of the target object photographed or captured by the third photographing unit 810, direction information about a direction toward the target object viewed by the third photographing unit 810, and azimuth information between the third user equipment 800 and the target object. Also, the third communication unit 840 may receive AR information of the target object from the AR management server 700. The AR management server 700 may store the AR information of the target object based on an azimuth. Accordingly, the AR management server 700 may transmit part or all of the stored AR information of the target object to the third user equipment 800.

The third tag generating unit 830 may generate an AR tag using AR information corresponding to azimuth information between the target object and the third photographing unit 810 among the received AR information of the target object.

Figure 9:
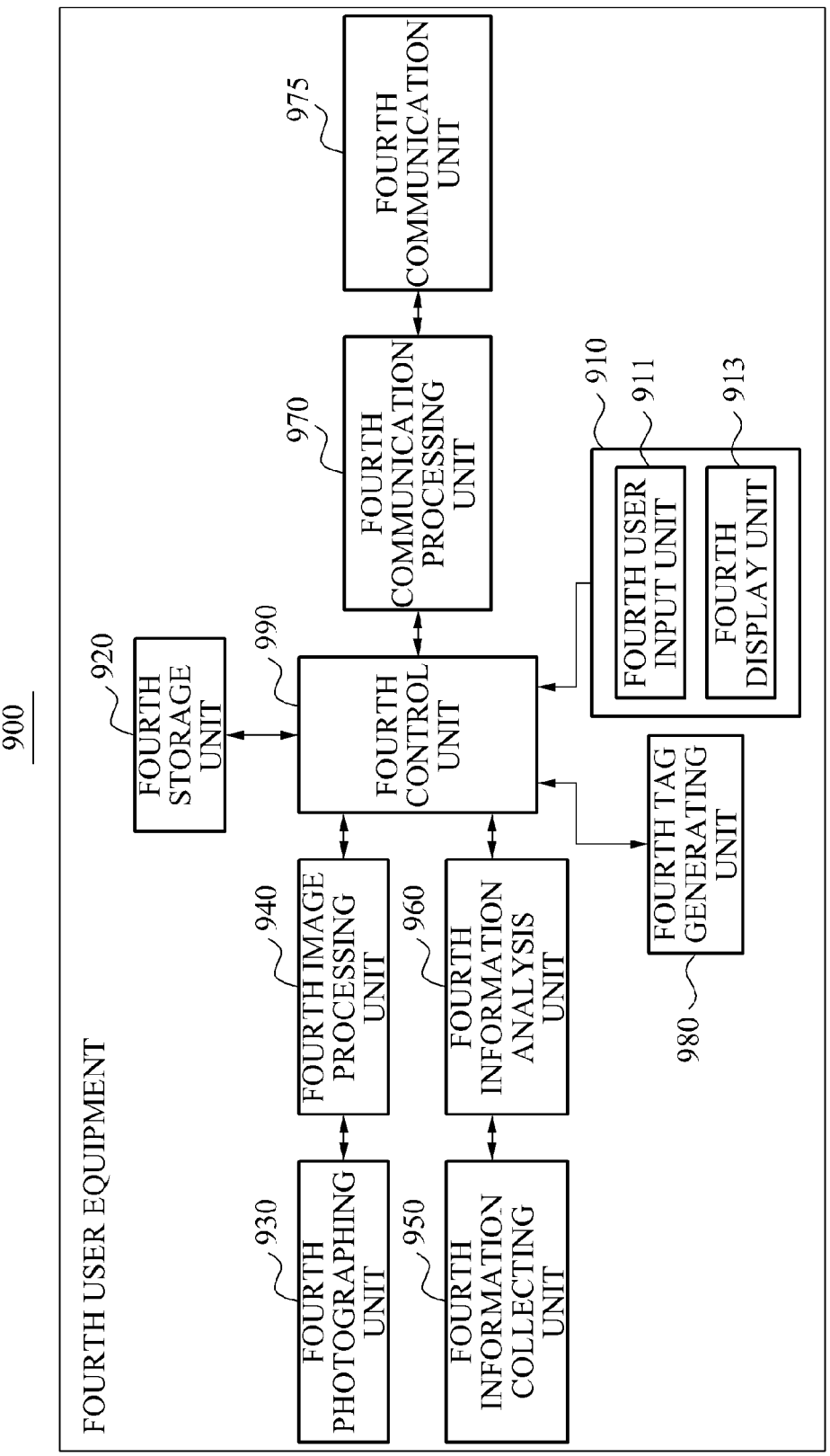
FIG. 9 is a block diagram of a fourth user equipment to provide an AR service according to an exemplary embodiment of the invention.

FIG. 9 is a block diagram of a fourth user equipment 900 to provide an AR service according to an exemplary embodiment of the invention.

Referring to FIG. 9, the fourth user equipment 900 may include a fourth UI unit 910, a fourth storage unit 920, a fourth photographing unit 930, a fourth image processing unit 940, a fourth information collecting unit 950, a fourth information analysis unit 960, a fourth communication processing unit 970, a fourth communication unit 975, a fourth tag generating unit 980, and a fourth control unit 990. The operation of the fourth storage unit 920, the fourth photographing unit 930, and the fourth image processing unit 940 of FIG. 9 is significantly similar to the operation of a second storage unit 220, a second photographing unit 230, and a second image processing unit 240 of FIG. 2. Accordingly, detailed description thereof is omitted herein.

The fourth UI unit 910 may provide an interface between a user and the user equipment 900, to receive user input and to display a response to the received user input. Further, the fourth UI unit 910 may include a fourth user input unit 911 and a fourth display unit 913.

The fourth storage unit 920 may store a program used to enable an operation of the user equipment 900, various data and information, and the like.

The fourth photographing unit 930 may photograph or capture an image of a target object to obtain image data of the target object, and may be, for example, an embedded camera or an external camera.

The fourth image processing unit 940 may analyze an image obtained from the fourth photographing unit 930, and may process the image into a displayable signal using the analysis result.

The fourth information collecting unit 950 may collect contextual information including information related to a location, a tilt position, and an azimuth of the user equipment 900. In an example, the fourth information collecting unit 950 may collect azimuth information if a request to display an AR tag based on an azimuth is received from a user.

The fourth information analysis unit 960 may analyze information collected by the fourth information collection unit 950 using a processible signal similar to the second information analysis unit 260 in FIG. 2 and FIG. 3. Thus, further discussion thereof will be omitted herein.

The fourth communication processing unit 970 may convert location information, direction information and image data of the target object into data based on a transmission protocol, by the control of the fourth control unit 990.

The fourth communication unit 975 may transmit data inputted from the fourth communication processing unit 970 to an AR management server (not shown in FIG. 9) via a communication network (not shown in FIG. 9). Also, the fourth communication unit 975 may receive at least one AR information of the target object from the AR management server. The AR management server may store the target object AR information corresponding to one or more contextual information. More specifically, the AR management server may store AR information corresponding to different azimuths.

The fourth communication processing unit 970 may convert the received AR information into data available in the fourth user equipment 900.

The fourth tag generating unit 980 may generate the AR tag corresponding to contextual information collected by the fourth information collecting unit 950 using AR information converted by the fourth communication processing unit 970. If a user requests the AR tag to be displayed based on an azimuth, the fourth tag generating unit 980 may generate the AR tag using AR information corresponding to the azimuth collected by the fourth information collecting unit 950. The generated AR tag may be displayed in the image of a UI described with reference to FIG. 4A, FIG. 4B, FIG. 4C, FIG. 5, and FIG. 6.

The fourth display unit 913 may display the AR tag generated by the fourth tag generating unit 980.

The fourth control unit 990 may control the entire operation of the fourth user equipment 900. In particular, the fourth control unit 990 may request the AR management server to provide AR information of a target object by transmitting various information, including location information, direction information, and image data of the target object to the AR management server.

If a request to display AR information based on an azimuth is received from a user, the fourth control unit 990 may control the fourth information collecting unit 950 to collect the azimuth information. If the azimuth information is collected, the fourth control unit 990 may extract AR information corresponding to the azimuth collected by the fourth information collecting unit 950 among one or more AR information received from the AR management server, and may provide the AR information to the fourth tag generating unit 980.

Figure 10:
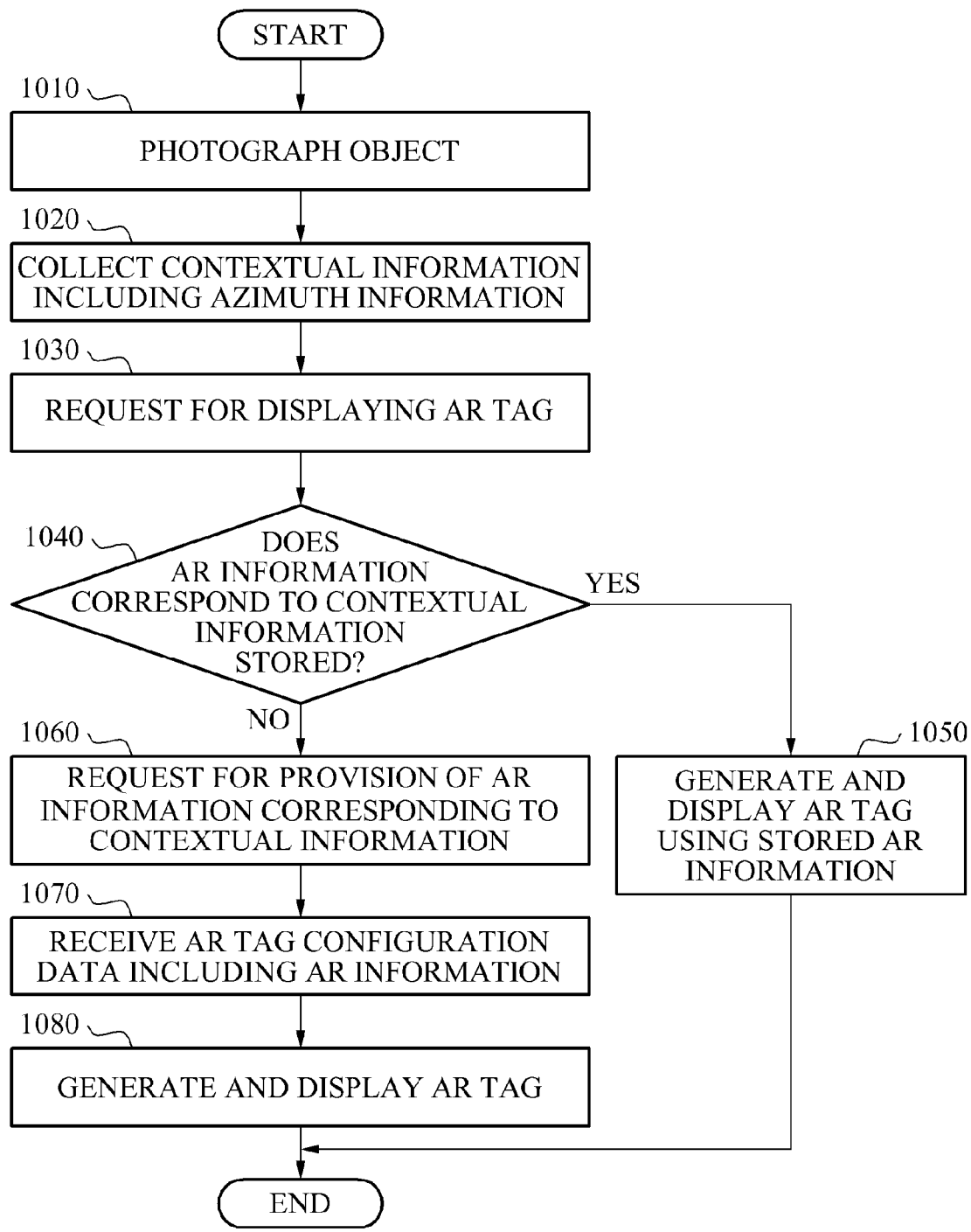
FIG. 10 is a flowchart illustrating a method for providing an AR service in a user equipment according to an exemplary embodiment of the invention.

FIG. 10 is a flowchart illustrating a method for providing an AR service in a user equipment according to an exemplary embodiment of the invention.

One or more operations of the method of FIG. 10 may be performed by a control unit or a processor of the first user equipment 100 of FIG. 1 or the second user equipment 200 of FIG. 2 without limitation thereto.

In operation 1010, a user may photograph or capture an image of a target object using a camera to obtain image data of the target object.

In operation 1020, the user equipment may collect contextual information related to the target object. The contextual information may include at least one of location information of the user equipment by which the target object was photographed or captured, azimuth information between the target object and the camera, and tilt information of the user equipment.

In operation 1030, the user equipment may receive a request for displaying an AR tag from the user.

In operation 1040, the user equipment may check whether AR information corresponding to the contextual information is stored in a memory of the user equipment.

If it is determined that AR information corresponding to the contextual information is stored in the memory of the user equipment in operation 1040, the user equipment may generate and display an AR tag corresponding to the collected contextual information using AR information stored in the memory, in operation 1050. Accordingly, different AR tags depending on an azimuth between the user and the target object may be provided to the user.

If it is determined that AR information corresponding to the contextual information is not stored in the memory of the user equipment in advance in operation 1040, the user equipment may request an AR management server to provide AR information corresponding to the contextual information in operation 1060. To request an AR management server to provide AR information corresponding to the contextual information, the user equipment may transmit the image data of the target object obtained in operation 1010 and the contextual information collected in operation 1020 to the AR management server, in operation 1060.

In operation 1070, the user equipment may receive AR tag configuration data including AR information corresponding to the contextual information from the AR management server.

In operation 1080, the user equipment may generate and display an AR tag using the received AR tag configuration data including AR information. If the user equipment receives AR information in operation 1070, the user equipment may generate an AR tag using the AR information.

Figure 11:
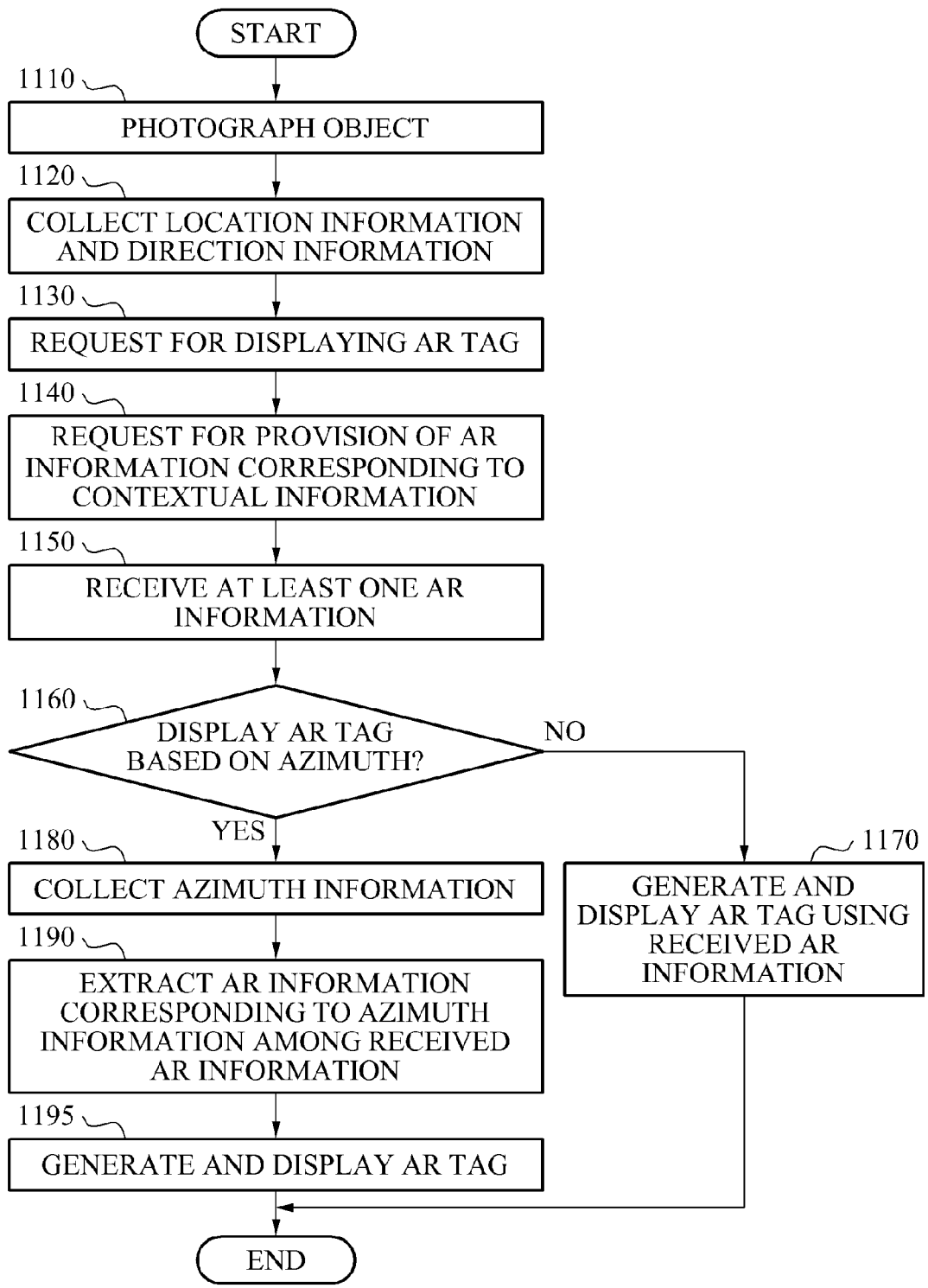
FIG. 11 is a flowchart illustrating a method for providing an AR service in a user equipment according to an exemplary embodiment of the invention.

FIG. 11 is a flowchart illustrating a method for providing an AR service in a user equipment according to an exemplary embodiment of the invention.

Each operation of the method of FIG. 11 may be performed by a control unit or a processor of the third user equipment 800 or the fourth user equipment 900.

In operation 1110, a user may photograph or capture an image of a target object using a camera to obtain image data of the target object.

In operation 1120, the user equipment may collect contextual information related to the target object. The contextual information may include at least one of location information, direction information, and tilt information of the user equipment that photographed or captured the target object. However, aspects are not limited thereto such that, for example, the tilt information may be omitted.

In operation 1130, the user equipment may receive a request for displaying an AR tag from the user.

In operation 1140, the user equipment may request an AR management server to provide AR information corresponding to the collected contextual information. To request an AR management server to provide AR information corresponding to the collected contextual information, the user equipment may transmit the image data of the target object obtained in operation 1110 and the contextual information collected in operation 1120 to the AR management server, in operation 1160.

In operation 1150, the user equipment may receive at least one AR information corresponding to the contextual information from the AR management server. For example, if different AR information of the same target object based on an azimuth is stored in the AR management server, the user equipment may receive part or all of the stored AR information of the target object.

If the user equipment does not receive a request for displaying the AR tag based on the azimuth from the user in operation 1160, the user equipment may generate and display the AR tag using the at least one received AR information, in operation 1170. If the received AR information is plural in number, the user equipment may generate the AR tag using AR information having a high frequency or accuracy.

If the user equipment receives a request for displaying the AR tag based on an azimuth from the user in operation 1160, the user equipment may collect azimuth information between the target object and the camera, in operation 1180.

In operation 1190, the user equipment may extract AR information corresponding to the collected azimuth information among the at least one collected AR information.

In operation 1195, the user equipment may generate and display the AR tag using the extracted AR information.

If the AR tag displayed in operation 1080 of FIG. 10 or in operation 1195 of FIG. 11 is the AR tag of FIG. 5 and a touch direction of the AR tag by the user may be sensed, the user equipment may display AR information of the target object corresponding to a different azimuth in a frontal direction by rotating the AR tag to a face touched by the user or by rotating the AR tag in the sensed touch direction.

The AR tag displayed in operation 1080 of FIG. 10 or in operation 1195 of FIG. 11 may be similar to the AR tag of FIG. 6. Accordingly, if the user rotates the user equipment in an arbitrary direction, the user equipment may enable AR information corresponding to an azimuth toward the object viewed in the arbitrary direction to be displayed in a frontal direction. More specifically, in an example, referring to FIG. 6, if the user equipment originally facing the first face is rotated in the right direction to face the second face, the second face may be viewed as the front facing direction.

According to exemplary embodiments of the present invention, a user equipment and a method provides an augmented reality (AR) service in which an AR tag may be selectively provided based on an azimuth toward an object viewed by a user, so that the user may see the targeted information.

Also, a user equipment and a method provides an AR service in which a three-dimensional stereoscopic AR tag may be provided and the AR tag may be rotated according to the received user input, so that different AR information of a target object, including AR information provided at a different view, may be provided without movement of a user to physically rotate.

Also, a user equipment and a method provides an AR service in which a user may rotate a user equipment in an arbitrary direction to provide AR information of a target object corresponding to the rotated direction.

According to the exemplary embodiments of the present invention as described above, different AR information depending on an azimuth between a location of a user and the target object may be provided. This feature may contribute to provisioning of a three-dimensional stereoscopic AR tag, and may enable various applications as described herein without limitation.

First, if a cubic AR tag is displayed in the same direction as an inner wall of a building, a user may see the inside of the building from the outside of the building. It may be possible by matching each face of the AR tag having six faces with each face of the building interior, and displaying each face of the building interior on each corresponding face of the AR tag. If the user sees one face of the building through a camera of the user equipment from outside of the building, the front face of the AR tag facing toward the user (first face) among a number of available of faces of the AR tag, may be transparently displayed. In addition, the other three faces of the AR tag, that is, right side face, a left side face and a rear face, of the building may be stereoscopically displayed. Also, if pictures displayed through the AR tag are updated using a moving picture camera in real time, it is possible to recognize the condition of the inside of the building from the outside of the building in real time.

Second, because the exemplary embodiments of the present invention consider information of tilt angles as well, including horizontal and/or vertical angles, that is, information about a tilt of a user equipment as well as an azimuth, the user may be provided with AR tags corresponding to the various angles. Also, if including height information, AR tags may be displayed in a spatial arrangement rather than in a horizontal arrangement, thereby providing a realistic view. Accordingly, the user may see an AR tag viewed in a horizontal direction, and also may see nearby AR tags located in a three-dimensional spatial arrangement in various directions and various angles if the user looks up at the target object or looks down on the target object through a camera.

Third, an AR tag may be used as a sign or a notice. For example, if an imagery sign or notice is displayed as an AR tag based on a location and a corresponding direction where a user stands, the sign or notice may not be displayed to a user located in the opposite direction to the user, thereby avoiding confusion. In an example, a confusion involving a traffic sign may be avoided if the stop sign is shown to the user facing the stop sign and not to the other persons that has passed the stop sign or to those who are driving on a freeway intersecting the street with the stop sign.

Fourth, a user equipment may display an azimuth between the target object and is the user equipment in real time using a sensor. Using this feature, if a user takes an image of the target object at a specific location, the user may use an AR tag generated at the specific location recommended by an expert. More specifically, the user may locate a camera and photograph or capture the target object with an azimuth recommended by the expert. The AR tag generated by the expert may show camera setting information and azimuth information used to photograph or capture the object.

Fifth, a user equipment may provide an AR tag having a constellation overlay on the AR tag, a constellation that is observed at a user location based on an azimuth toward the night sky viewed by the user. In this instance, the user equipment may overlay the constellation having added time information on the AR tag. Accordingly, the user may observe information related to the constellation with eyes of the user.

Sixth, in the case of, for example, a building or a subway having multiple exits, the user equipment may display an AR tag based on an azimuth at a current location. Accordingly, at the current location a user may recognize whether an exit displayed in a frontal direction is a front gate or a back gate through the AR tag.

Seventh, if the user gets lost on a mountain, the user equipment may provide information about a direction to a trail at a current location. In addition, the user equipment may provide information about a shelter or nearby topography through an AR tag.

Eighth, if a camera of the user equipment faces a parking lot, the user equipment may display a location where a car may be parked using an AR tag. In addition, after the user has parked, it may guide the user to an exit or entrance of a building.

Ninth, the user equipment may display various shapes of an AR tag as well as a various content of the AR tag depending on an azimuth. Accordingly, the user may easily recognize the AR tag and the azimuth.

Tenth, the user equipment may provide AR information of the AR tag displayed based on an azimuth, and also may provide common information of the AR tag regardless of an azimuth. The providing of the information may be applicable if the user sees a map.

Eleventh, using a feature of an AR tag based on an azimuth to display a single face, various tags may be generated on celestial bodies and planets. Because other planets as well as the earth move in an orbit and rotate about an axis, the displayed face may change with time. In this instance, the user may set a tag on a desired face.

Twelfth, the user equipment may display an AR tag on various faces, for example, the floor, the ceiling, and the roof of a building, and the like, depending on an azimuth. This may be useful in a mural, and information for a floor map of a large sized building.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media, such as hard disks, floppy disks, and magnetic tape; optical media, such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A user equipment to provide an augmented reality (AR) service, the user equipment comprising:
    a photographing unit to capture an image of a target object;
    an information collecting unit to collect contextual information of the captured image of the target object, the contextual information comprising a location information of the photographing unit and a first azimuth information between the target object and the photographing unit;
    a tag generating unit to generate an AR tag based on a first direction, the AR tag corresponding to the contextual information; and
    a display unit to display the captured image of the target object and the AR tag,
    wherein the tag generating unit generates a three-dimensional AR tag based on the AR information.

2. The user equipment of claim 1, further comprising:
    an AR information management server to store AR information corresponding to the contextual information;
    a communication unit to communicate with the AR management server; and
    a control unit to control the communication unit to transmit the AR information to the AR management server.

3. The user equipment of claim 1, further comprising:
    a storage unit to store AR information corresponding to the contextual information, wherein the tag generating unit generates the AR tag based on the AR information collected from the storage unit.

4. The user equipment of claim 1, wherein the tag generating unit generates an AR tag having one or more faces along a contour of the target object.

5. The user equipment of claim 4, wherein different AR information based on the azimuth between the target object and the photographing unit is displayed on the one or more faces of the AR tag.

6. The user equipment of claim 1, further comprising:
    a user input unit to receive a user input to rotate the displayed AR tag,
    wherein the tag generating unit provides AR information of the target object corresponding to a second azimuth by rotating the displayed AR tag according to the received user input.

7. The user equipment of claim 1, further comprising:
    a user input unit to receive a selection of a second face displaying the AR tag; and
    wherein the tag generating unit rotates the AR tag according to the selected second face so that the second face is facing the user to provide AR information of the target object corresponding to a second azimuth on the second face.

8. The user equipment of claim 1, wherein the tag generating unit generates an AR tag corresponding to the first azimuth toward the target object viewed in a second direction relative to the target object if the user equipment capturing the target object is moved in the second direction.

9. A user equipment to provide an augmented reality (AR) service, the user equipment comprising:
    a photographing unit to capture an image of a target object;
    an information collecting unit to collect contextual information of the captured image of the target object, the contextual information comprising location information of the photographing unit and image data of the target object;
    a communication unit to transmit the collected contextual information to an AR management server and to receive AR information of the target object from the AR management server, wherein the AR management server stores the AR information of the target object based on azimuth information of the captured image;
    a tag generating unit to generate an AR tag based on AR information corresponding to a first azimuth between the target object and the photographing unit; and
    a display unit to display the captured image of the target object and the generated AR tag,
    wherein the tag generating unit generates a three-dimensional AR tag based on the AR information.

10. The user equipment of claim 9, wherein the information collecting unit further collects azimuth information of the first azimuth between the target object and the photographing unit,
    wherein if the collected azimuth information is changed, the tag generating unit generates an AR tag based on AR information corresponding to a second azimuth information.

11. The user equipment of claim 9, wherein the tag generating unit generates an AR tag having one or more faces along a contour of the object.

12. The user equipment of claim 11, wherein the AR information based on an azimuth between the target object and the photographing unit is displayed on one or more faces on the AR tag.

13. The user equipment of claim 9, further comprising:
a user input unit to receive a user input to rotate the displayed AR tag, wherein the displayed AR tag is rotated to a second position according to the received user input, and
wherein the tag generating unit provides AR information of the target object corresponding to a second azimuth corresponding to the second position of the AR tag.

14. The user equipment of claim 9, wherein the tag generating unit generates an AR tag corresponding to a second azimuth toward the target object viewed in a second position relative to the target object if the user equipment is rotated.

15. A method for providing an augmented reality (AR) service, the method comprising:
capturing an image of a target object with a camera;
collecting contextual information including location information of the captured image of the target object and a first azimuth information between the target object and the camera;
generating an AR tag corresponding to the contextual information; and
displaying the captured image of the target object and the generated AR tag,
wherein the generating of the AR tag comprises generating a three-dimensional AR tag based on the AR information.

16. The method of claim 15, further comprising:
requesting an AR management server to provide AR information corresponding to the contextual information, wherein the AR management server stores the AR information; and
receiving the AR information from the AR management server.

17. The method of claim 15, wherein the generating of the AR tag comprises generating the AR tag based on AR information corresponding to the contextual information, wherein the contextual information is stored in the user equipment.

18. The method of claim 15, wherein the generating of the AR tag comprises generating the AR tag having one or more faces along a contour of the target object.

19. The method of claim 18, wherein the displaying comprises displaying the AR information based on the first azimuth between the target object and the camera on the one or more faces of the AR tag.

20. The method of claim 15, further comprising: receiving a user input to rotate the displayed AR tag; and providing the AR information of the target object corresponding to a second azimuth by rotating the displayed AR tag according to the received user input.

21. The method of claim 18, further comprising:
sensing a selection of a second face of the generated AR tag;
rotating the AR tag according to the selected second face so that the second face is facing the user; and
displaying the AR information of the target object corresponding to a second azimuth on the second face.

22. The method of claim 15, further comprising:
generating an AR tag corresponding to a second azimuth toward the target object viewed in a second position relative to the target object if the user equipment capturing the target object is rotated.

23. A method for providing an augmented reality (AR) service, the method comprising:
capturing an image of a target object;
collecting contextual information comprising location information of the captured image and image data of the captured image;
transmitting the collected contextual information to an AR management server to store AR information of the target object for a first azimuth;
receiving the AR information of the target object from the AR management server;
generating an AR tag based on the AR information corresponding to the first azimuth between the target object and the camera; and
displaying the captured image of the target object and the AR tag,
wherein the generating of the AR tag comprises generating a three-dimensional AR tag based on the AR information corresponding to the contextual information.

24. The method of claim 23, wherein contextual information further comprises azimuth information of a second azimuth between the target object and the camera, and
wherein the generating of the AR tag comprises generating the AR tag based on the AR information corresponding to the second azimuth information.

25. The method of claim 23, wherein the generating of the AR tag further comprises generating the AR tag having one or more faces along a contour of the target object, and displaying the AR information based on the first azimuth between the target object and the camera on one or more faces of the AR tag.

* * * * *